United States Patent [19]

Bernat

[11] 4,179,348

[45] Dec. 18, 1979

[54] REMOVAL OF CYANIDE FROM WASTE WATER

[75] Inventor: Jean-Pierre Bernat, Pau, France

[73] Assignee: Societe Nationale Elf Aquitaine (Production), Paris, France

[21] Appl. No.: 848,298

[22] Filed: Nov. 3, 1977

[30] Foreign Application Priority Data

Nov. 3, 1976 [FR] France .............................. 76 33076

[51] Int. Cl.² .................................................. B01D 13/02
[52] U.S. Cl. ................................ 204/151; 204/180 P; 210/23 R
[58] Field of Search .............. 210/DIG. 31, 22, 23 R; 204/151, 152, 180 P, 130, 290 F

[56] References Cited

U.S. PATENT DOCUMENTS

| | | | |
|---|---|---|---|
| 2,535,035 | 12/1950 | Briggs | 204/151 |
| 3,728,238 | 4/1973 | Tarjanyi et al. | 204/130 |
| 3,751,296 | 8/1973 | Beer | 117/230 |
| 3,764,497 | 10/1973 | Tarjanyi et al. | 204/130 |
| 3,764,498 | 10/1973 | Tarjanyi et al. | 204/130 |
| 3,764,499 | 10/1973 | Okubo et al. | 204/151 |
| 3,804,733 | 4/1974 | Bennion et al. | 204/151 |
| 3,847,765 | 11/1974 | Uno et al. | 204/151 |
| 3,904,496 | 9/1975 | Harke et al. | 204/98 |
| 3,909,381 | 9/1975 | Ehrsam | 204/180 P |
| 3,970,531 | 7/1976 | Recht | 204/149 |
| 4,042,758 | 8/1977 | Weinstein et al. | 429/111 |
| 4,118,295 | 10/1978 | Korenowski et al. | 204/151 |

FOREIGN PATENT DOCUMENTS

1375025 11/1974 United Kingdom.

*Primary Examiner*—Charles N. Hart
*Assistant Examiner*—David R. Sadowski
*Attorney, Agent, or Firm*—Ostrolenk, Faber, Gerb & Soffen

[57] ABSTRACT

A method and device for eliminating the cyanide ion from waste water by anodic oxidation, using an electrodialyzer. Water enters the anode compartment of the dialyzer, which is separated from the cathode compartment by a semi-permeable diaphragm permeable to cations; an alkaline solution travels through the cathode compartment. No reagent is added.

5 Claims, 1 Drawing Figure

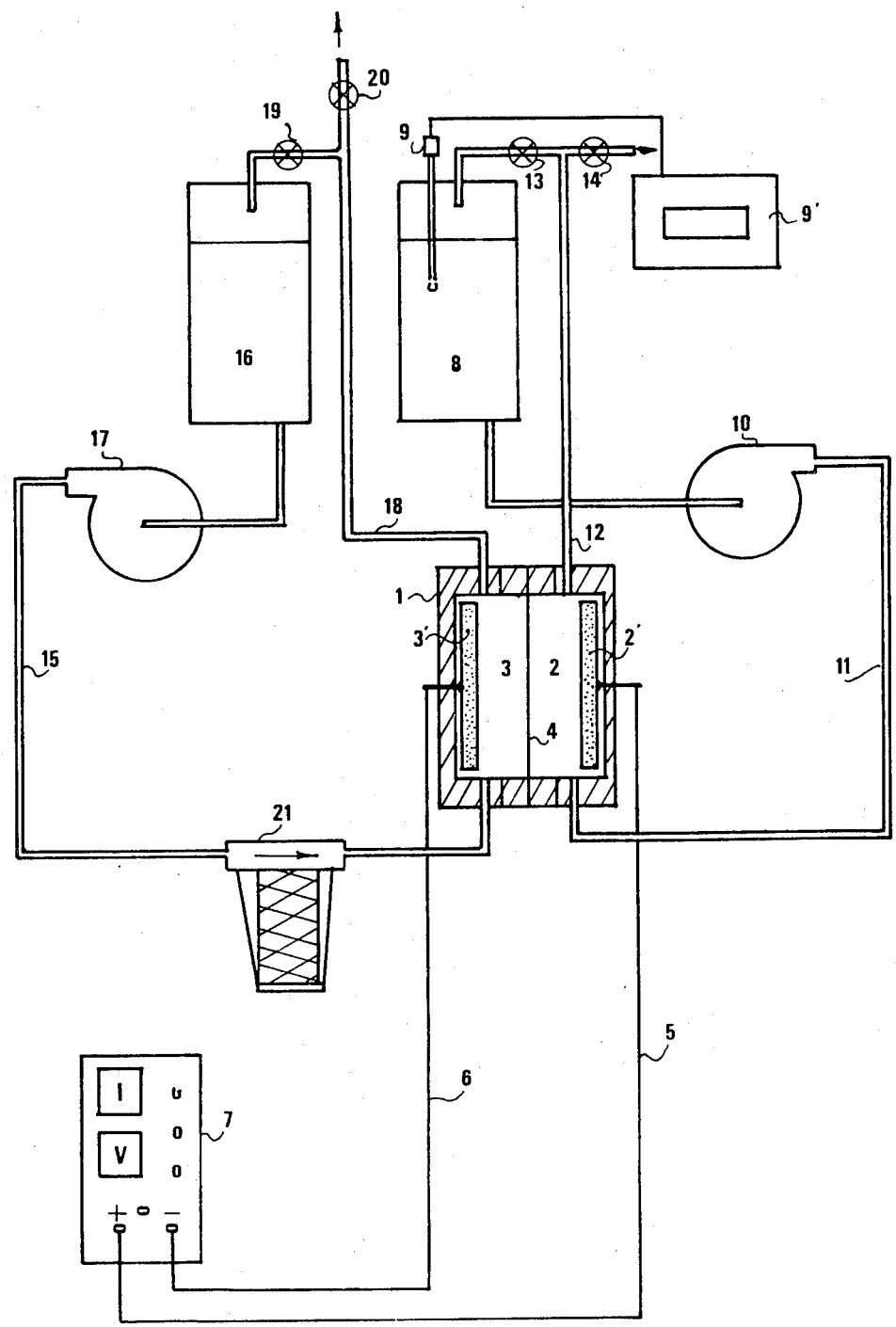

REMOVAL OF CYANIDE FROM WASTE WATER

The invention relates to a novel method of eliminating cyanides from various kinds of waste water. It also comprises an installation for performing the method.

Waste water loaded with cyanides is discharged from various industrial plants, inter alia, in the iron industry and in coke plants. The water may contain up to 20 mg of CN⁻ per liter. Spent electroplating baths contain 10 to 80 g cyanide per liter, and washing water contains variable amounts, which may be up to 0.4 g/l expressed as NaCN. Variable concentrations of CN⁻ also occur in the water from thermal processing. Since, by law in many places, the proportion of CN must be below 0.1 to 1 mg/l, depending on the receiving medium, it is absolutely necessary for the cyanides in the aforementioned waste water be thoroughly eliminated before the water is discharged into the environment. In view of the importance of this problem, a number of methods of elimination have been used hitherto, but each method has some weak point or disadvantage, so that there is still a need for a more efficient, economic method of cyanide removal. For example, processing of waste water with chemical reagents, more particularly oxidizing agents such as hypochlorite, Caro's acid or chlorine, requires large quantities of reagents and is unsuited to effluents which are rich in cyanide. Electrolytic oxidation, which eliminates CN⁻ at the anode, produces the opposite reaction at the cathode, so that oxidizing agents have to be added. Catalytic thermal destruction requires complex technology and can be performed only in large processing units. Furthermore, all the known processes introduce salt reagents into the effluent, resulting in secondary pollution. In addition, still further treatment is required for eliminating non-alkaline metal cations, when such cations are present in the cyanides to be eliminated.

The invention can obviate the aforementioned disadvantages of the known methods. It provides a process which does not require any reagent to be introduced into the waste water for treatment and, in a single operation, eliminates the CN⁻ ion simultaneously with any cations in the effluent. In addition, the novel method is very economic and eliminates cyanides very efficiently.

The novel method according to the invention, which comprises the destruction of the CN⁻ ion by anodic oxidation, is characterised in that the waste water containing cyanide is introduced into the anode compartment of an electrodialyser comprising a semi-permeable diaphragm which separates the anodic compartment from the cathode region and is permeable to cations, whereas a salt and/or basic solution travels through the cathode region.

Thus, according to the invention, CN⁻ is oxidized in the anodic region of the electrodialyser, and the cations which have travelled through the diaphragm are simultaneously discharged at the cathode. In this manner, the CN⁻ ions are eliminated at the same time as the cations in the waste water, provided that the water for treatment flows through the anode compartment at a rate in proportion to the electric current flowing in the electrodialytic cell. In addition, the pH has to be monitored in the two compartments. On the other hand, the auxiliary water conveyed through the cathode compartment is given a suitable salt content and pH for the cations to be dialysed in normal manner, the cations being discharged at the cathode.

In the cathode compartment, a metal, e.g.

or Cu from the waste water, can be electrolytically deposited, hydrogen can be evolved when the alkaline cations are discharged and/or metal hydroxides from the water for purification can be precipitated. Irrespective of the process which occurs, the catons are eliminated by the method according to the invention, since they migrate through the semi-permeable diaphragm.

The voltage to be applied between the anode and the cathode of the electrodialyser depends of course on various factors, more particularly the distance between the electrodes and the resistivity of the anode and cathode solutions. In practice, in the method according to the invention, the voltage is usually approx. 5 to 15 V, generally 9 to 13 V. The anode current density should remain within certain limits so that the cyanogen ion is oxidized properly, without excessive release of oxygen. The current density is usually between 2 and 4 A/dm². Under these conditions, the two stages in the destruction of CN⁻ occur in normal manner, i.e. oxidation to the cyanic ion, which is subsequently oxidized to nitrogen and carbon dioxide. At the end of the process, oxygen is liberated and the pH falls in the anode compartment. This means that, if the solution for treatment flows continuously upwards along the anode, cyanate forms in the bottom part thereof and is converted to $CO_2$ and $N_2$ higher up, whereas oxygen is released at the top of the compartment before the liquid flows out.

Experience has shown that the method according to the invention gives the best results when the pH of the anode flow is between 10 and 13.5, preferably between 11 and 13.

The solution introduced into the cathode compartment should be such that the liquid in the cathode region has adequate conductivity. Accordingly, the solution can comprise water containing a low concentration of a harmless electrolyte, such as NaCl, KCl, $Na_2SO_4$, $K_2SO_4$, $Na_2SO_3$, $K_2SO_3$, $Na_2CO_3$, $K_2CO_3$, NaOH, KOH etc. the cheapest being sodium hydroxide. Preferably the concentration is such that the resistivity of the cathode liquid may reach up to 1000 ohm.cm and is generally comprised between 25 and 1000, and is preferably of 200 to 600 ohm.cm. The pH of the cathode compartment is preferably between 9 and 14, more particularly 11 to 13.

The method according to the invention can be performed in known electrodialysers comprising means for conveying liquids between the two compartments therein, and devices for monitoring the pH. The electrodes of the electrodialyzer may be constituted of usual materials; particularly suited are electrodes of lead coated iron, of titanium, of platinum coated tantalum or rhodium coated tantalum.

The accompanying drawing shows an electrodialyser 1 having an anode compartment 2 separated from the cathode compartment by a semi-permeable cationic diaphragm 4. Reference 5 denotes an electric lead supplying the anode 2' whereas reference 6 denotes the corresponding lead to cathode 3'. Electric power is supplied from a d.c. distribution board 7, at a voltage of the order of 5 to 15 V.

An intermediate tank 8 contains a batch of waste water for treatment, containing cyanides which must be eliminated. The pH of the water is adjusted by means (not shown in the drawing) after the pH has been measured by a monitoring device 9–9'. The liquor from tank 8 is pumped by a pump 10, via duct 11 to the bottom of the anode compartment 2; it travels up through the anode region along diaphragm 4 and anode 2' and leaves through pipe 12 at the top of the electrodialyser. When the device is used in continuous operation, valve 13 on pipe 12 is closed and valve 14 is open. In that case, the cyanide-free waste water flows out in the direction of the arrow at the right of valve 14. In batch operation, on the other hand, valve 13 is open and valve 14 is closed, in which case the liquor coming from the dialyser flows back to tank 8 where its pH is re-adjusted. Samples of the liquor are analysed and the flow is stopped when the content of $CN^-$ has fallen below the desired limit. The thus treated water is then discharged through a pipe (not shown in the drawing) at pump 10.

During electrodyalysis, the cathode compartment 3 is supplied from below through duct 15 with a suitable solution, e.g. soda or sodium chloride, coming from tank 16. The flow is maintained by a pump 17. The solution travels through the cathode compartment 3 along cathode 3' and diaphragm 4. During this journey it receives cations which, as a result of the potential difference between 2' and 3', travel through diaphragm 4 and migrate towards cathode 3'. At the top of the electrodialyser, the solution leaves through a pipe 18. In the case of continuous operation, valve 19 is closed whereas valve 20 is open. The cathode solution is sent through valve 20 to a device (not shown) where it is processed for re-use. If the cations collected in compartments 3 have made the solution alkaline and/or have caused metal hydroxides to precipitate the solution is simply analysed and suitably diluted and/or filtered, neutralized and diluted. When the cations are deposited on electrode 3', the electrode is periodically replaced.

If the operation is performed batchwise, valve 20 is closed and valve 19 is left open. The solution from tank 16 flows between the tank and compartment 3 as long as it has the appropriate composition. In this method, a filter 21 is placed in the part of the solution between pump 17 and compartment 3 in order to retain any solids, inter alia, metal hydroxides, precipitated in the cathode compartment.

The semi-permeable diaphragm 4 can be of a kind well known in the art and need not therefore be described here. The preparation of some of the diaphragms used in the invention is described e.g. in French Pat. Spec. No. 1 297 599 and Swiss Pat. Spec. No. 305 105. Here, we shall only name some semi-permeable cathode membranes which can easily be obtained commercially, e.g. A.M.F. type C 60 and C 100; IONAC type MC 3142 and 3470; IONICS type CR 61 AZL 183; TS Ltd type CL 25T; ACI type CK 1 and DK 1; RHOM & HAAS type C 1 and PERMUTIT C 10. Commercial diaphragms usually have an ion exchange capacity of 1 to 2.5 meq/g. Of course, the diaphragms should have the optimum resistance to bursting, combined with low chemical resistance.

An important factor is the distance between electrodes, and between each electrode and the diaphragm. Advantageously, in order to reduce the electric resistance of the liquid to a minimum, the aforementioned distance should be at a minimum. In an embodiment of the invention, the space "e" between each electrode 2' and 3' and diaphragm 4 can be 1 to 30 mm, preferably 1 to 5 mm.

By way of non-limitative example for illustrating the invention, the following data relate to a method of cyanide removal using the aforementioned device.

The effluent for processing was an aqueous solution containing 100 mg of $CN^-$ per liter. The main cation was sodium plus a small proportion of Zn.

The electrodes were iron lined with lead and each had a surface of 0.5 dm$^2$.

The semi-permeable membrane was NEO SEPTA type CL 25 T, having a surface of 0.5 dm$^2$.

The spacing "e" of the diaphragm relative to each electrode was 1 mm. Intermediate components were inserted to prevent the diaphragm touching the electrodes.

The solution for processing was supplied at a rate of 120 L/h through the anode compartment 2, whereas 140 l/h of water containing 1% NaOH flowed through compartment 3.

The pH of the solution for treatment was adjusted to 11.3.

The potential difference in operation was 15 V and the current varied from 0.8 A at the beginning to 0.25 A at the end of the operation.

Practically all the cyanide was eliminated in approx. 1 hour.

The consumption of electrical energy for eliminating cyanides by the method according to the invention varies with the concentration in the processed water. If the cyanide is diluted, corresponding more KWh are required per kg of $CN^-$ eliminated. The following numerical data were obtained in a single electrodialyser at 12 V, the spacing "e" being 30 mm, for solutions containing variable amounts of $CN^-$. The figures for $CN^-$ g/l indicate the initial and final concentration levels. $W_s$ is the energy in KWh consumed per kg of $CN^-$ destroyed.

| $CN^-$ g/l | $W_s$ |
|---|---|
| from 4.47 to 4.00 | 12.0 |
| 2.08 to 1.87 | 13.0 |
| 0.58 to 0.55 | 24 |
| 0.20 to 0.11 | 33 |

The energy consumption also varies with the nature and state of the semi-permeable diaphragm, and varies greatly with the spacing between the diaphragm and the electrode. Thus, if the spacing is only 1 mm between the diaphragm and each electrode, the following result is obtained in 5 minutes at 12 V:

0.057 g/l $CN^-$ is reduced to practically zero, using 16.8 KWh per kg of $CN^-$ eliminated.

In practice, the average energy consumption in the method according to the invention, in order to eliminate 1 kg of $CN^-$, is approximately the following:

16 KWh for electroplating baths and
32 KWh for washing water.

Accordingly, cyanide can be removed at lower cost than in conventional processes.

I claim:

1. A method of eliminating $CN^{31}$ ions from waste water by anodic oxidation, wherein the water for processing enters only the anodic compartment of an electro-dialyser consisting essentially of a semi-permeable diaphragm which is permeable to cations and separates the anode compartment from the cathode compartment, and a separate aqueous solution of electrolyte is conveyed through the cathode compartment, said separate electrolyte comprising an electrolyte from a source other than said water to be processed.

2. A method according to claim 1, wherein the solution travelling through the cathode compartment has a concentration such that the cathode liquor has a resistivity of 25 to 1,000 ohm.cm.

3. A method according to claim 2, wherein the pH of the waste water for treatment is adjusted to between 10 and 13.5, the voltage between the electrodes is 5 to 15 V and the density of the anode current is 2 to 4 A/dm$^2$, the aqueous solution conveyed through the cathode compartment being a solution selected from the group consisting of NaCl, $Na_2SO_4$, $K_2SO_4$ and NaOH at a concentration which is adjusted so that the resistivity of the solution is about 200 to about 600 ohm.cm.

4. A method according to claim 3 wherein the pH of the aqueous solution conveyed through the cathode compartment is adjusted to between 9 and 14.

5. A method according to claim 4, wherein the pH of the waste water for treatment and of the aqueous solution conveyed through the cathode compartment is adjusted to between 11 and 13 and wherein the voltage between the electrodes is 9 to 13 V.

* * * * *